US009777873B1

(12) United States Patent
Crompton et al.

(10) Patent No.: US 9,777,873 B1
(45) Date of Patent: Oct. 3, 2017

(54) SIDE LOCKING CONDUIT DEVICE AND JOINT ASSEMBLY

(71) Applicant: Quick Fitting, Inc., Warwick, RI (US)

(72) Inventors: David B. Crompton, Tiverton, RI (US); Libardo Ochoa Dias, West Warwick, RI (US); Herbert J. Bouchard, West Greenwich, RI (US)

(73) Assignee: Quick Fitting, Inc., Warwick, RI (US)

( * ) Notice: Subject to any disclaimer, the term of this patent is extended or adjusted under 35 U.S.C. 154(b) by 0 days.

(21) Appl. No.: 15/341,808

(22) Filed: Nov. 2, 2016

(51) Int. Cl.
*F16L 21/08* (2006.01)
*F16L 19/07* (2006.01)
*F16L 17/02* (2006.01)
*F16L 21/02* (2006.01)

(52) U.S. Cl.
CPC .............. *F16L 21/08* (2013.01); *F16L 17/02* (2013.01); *F16L 19/07* (2013.01); *F16L 21/02* (2013.01)

(58) Field of Classification Search
CPC ......... F16L 21/02; F16L 21/065; F16L 21/08; F16L 17/02; F16L 37/091; F16L 19/07; F16L 19/0212; F16L 21/04; F16L 21/05; F16L 21/007; F16L 2201/10

USPC ................................................... 285/342, 343
See application file for complete search history.

(56) References Cited

U.S. PATENT DOCUMENTS

| 9,068,680 | B1* | 6/2015 | Crompton | F16L 37/091 |
| 2003/0020279 | A1* | 1/2003 | Houtschilt | F01N 13/1805 |
| | | | | 285/420 |
| 2005/0225087 | A1* | 10/2005 | McMahon | F16L 21/08 |
| | | | | 285/412 |
| 2013/0241198 | A1* | 9/2013 | Eaton | F16L 21/08 |
| | | | | 285/367 |
| 2016/0290538 | A1* | 10/2016 | Kawanishi | F16L 21/08 |

* cited by examiner

*Primary Examiner* — Gregory Binda
*Assistant Examiner* — Zachary Dragicevich
(74) *Attorney, Agent, or Firm* — Williams Mullen PC; Thomas F. Bergert

(57) ABSTRACT

A locking pipe joint device employs a center body connector, one or more sealing elements, such as a wiper seal and a sealing ring, a sealing ring retainer, an indicator ring and a retaining cap. In various embodiments, the retaining cap and the center body connector include mating block members that permit sliding bolted connection along an axis perpendicular to the main axis of the center body connector, which allows the retaining cap to tighten the packing arrangement components around an inserted piping or tubing element, and in secure engagement with the interior of the center body connector.

22 Claims, 11 Drawing Sheets

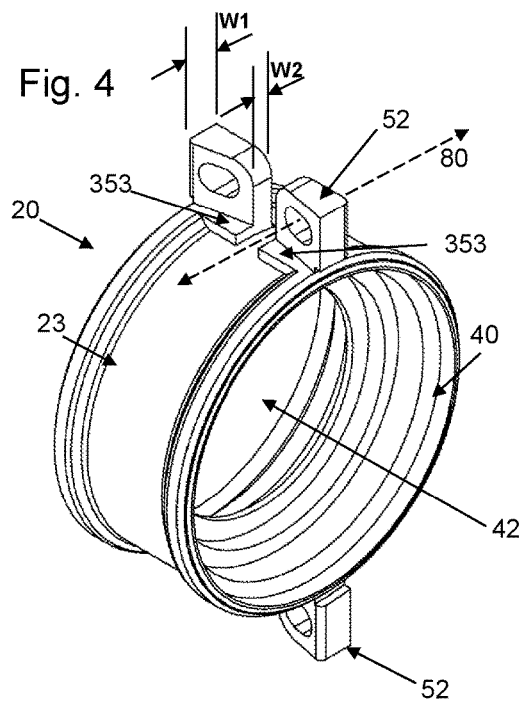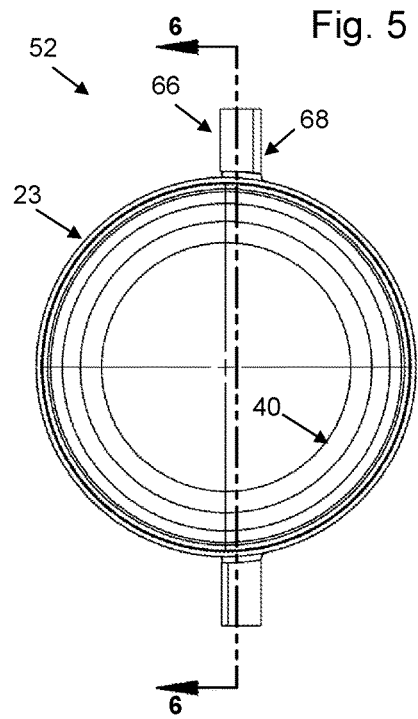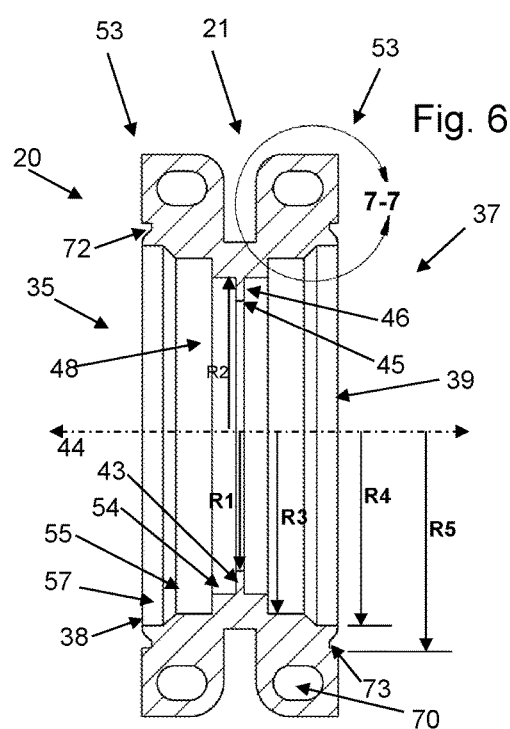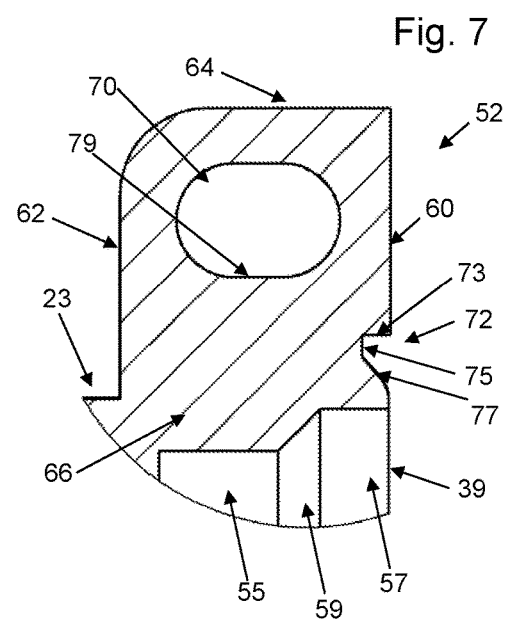

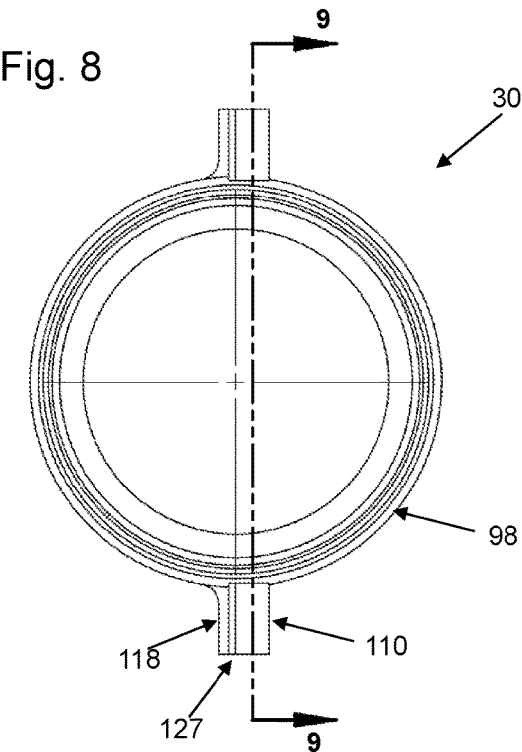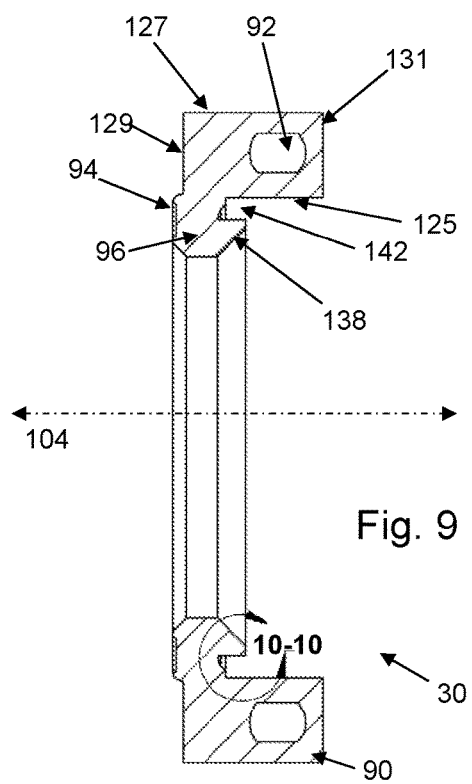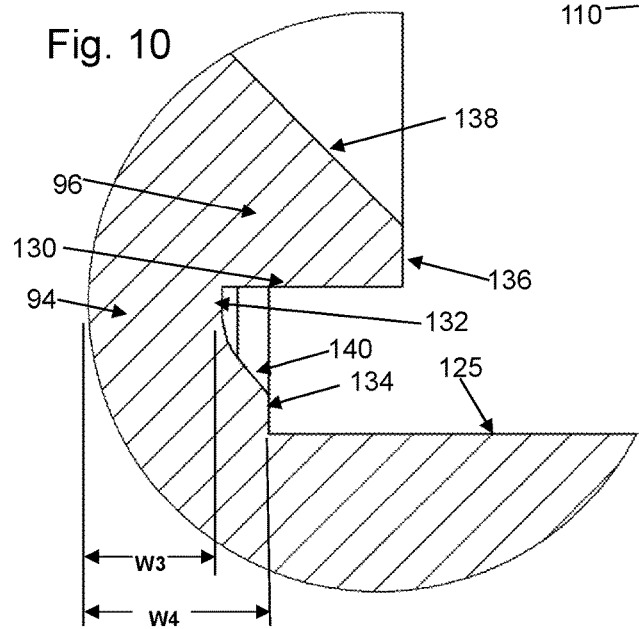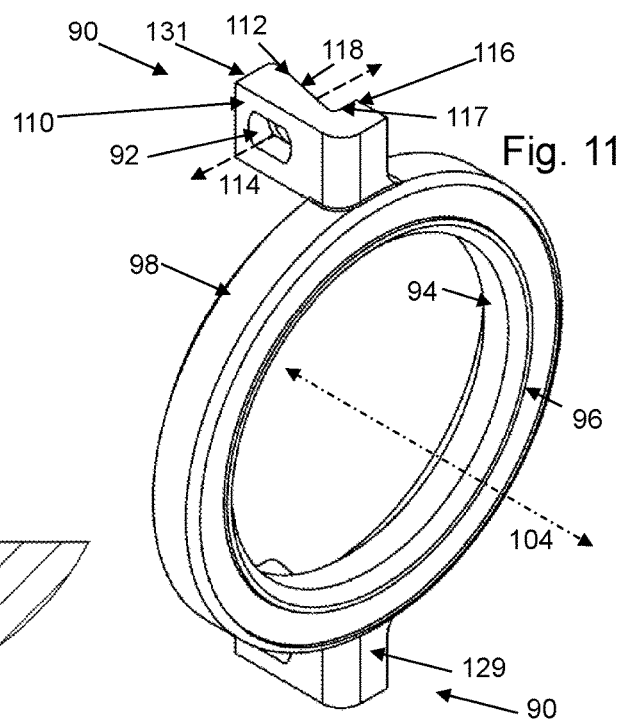

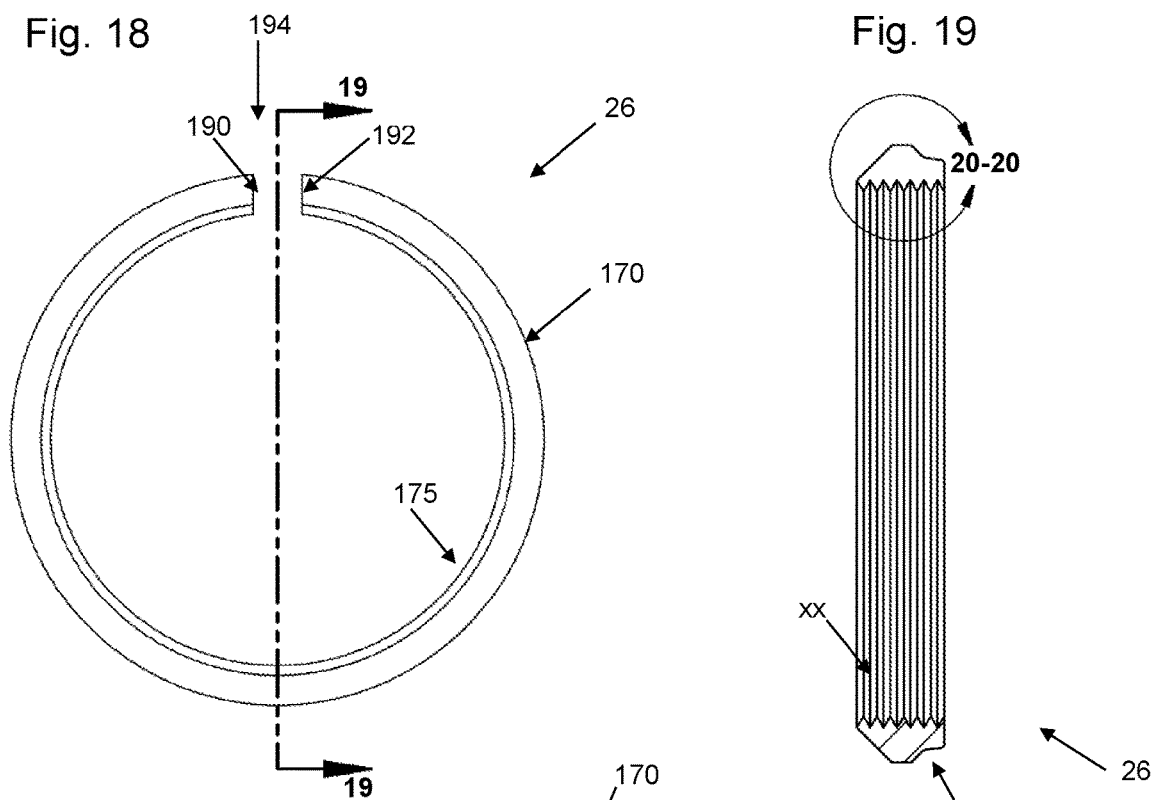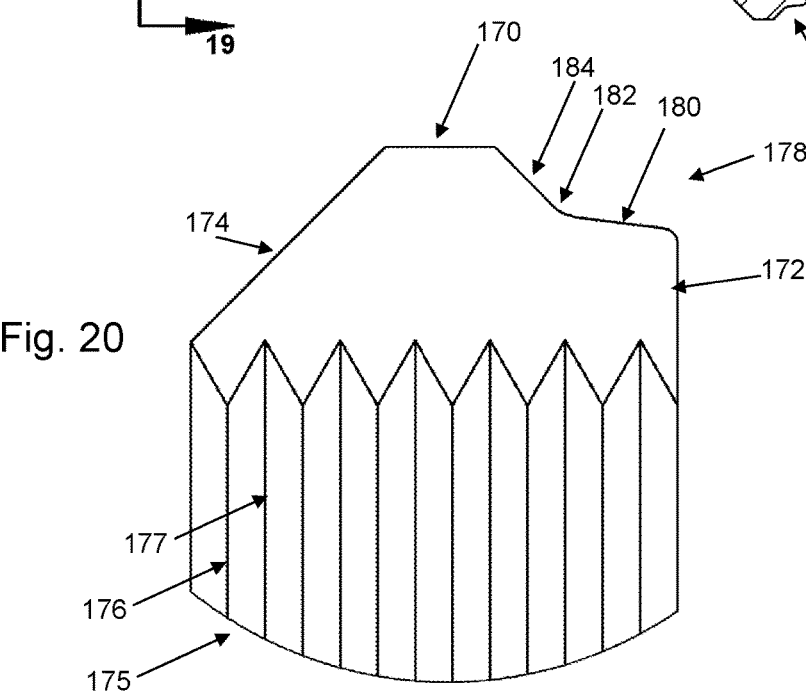

SIDE LOCKING CONDUIT DEVICE AND JOINT ASSEMBLY

TECHNICAL FIELD

The present disclosure relates generally to fluid flow systems, and more particularly to a locking push-fit joint packing arrangement, device and method for providing zero resistance to a piping element to be inserted or removed.

BACKGROUND

Piping systems exist to facilitate the flow of fluids (e.g., liquid, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, cleaning chemicals, waste water, plant cooling water and paint and coatings are just some examples of the types of fluids and gases that can be deployed through piping systems. Tubing/piping types can include, for example, copper, stainless steel, CPVC (chlorinated polyvinyl chloride), iron, black iron, ductile iron, gray iron, HDPE (high density polyethylene) and PEX (cross-linked polyethylene). For purposes of the present disclosure, the term "pipe" or "piping" will be understood to encompass one or more pipes, tubes, piping elements and/or tubing elements.

Piping connections are necessary to join various pieces of pipe and must be versatile in order to adapt to changes of pipe direction required in particular piping system implementations. For example, fittings and valves may be employed at the ends of open pieces of pipe that enable two pieces of pipe to fit together in a particular configuration. Among fitting types there are elbows, "tees", couplings adapted for various purposes such as pipe size changes, ends, ball valves, stop valves, and partial angle connectors, for example.

In the past, pipe elements have been traditionally connected by welding and/or soldering them together using a torch. Soldering pipe fittings can be time-consuming, unsafe, and labor intensive. Soldering also requires employing numerous materials, such as copper pipes and fittings, emery cloths or pipe-cleaning brushes, flux, silver solder, a soldering torch and striker, a tubing cutter and safety glasses. The process for soldering pipes can proceed by first preparing the pipe to be soldered, as the copper surface must be clean in order to form a good joint. The end of the pipe can be cleaned on the outside with emery cloth or a specially made wire brush. The inside of the fitting must be cleaned as well. Next, flux (a type of paste) can be applied to remove oxides and draw molten solder into the joint where the surfaces will be joined. The brush can be used to coat the inside of the fitting and the outside of the pipe with the flux. Next, the two pipes are pushed together firmly into place so that they "bottom out"—i.e., meet flush inside the fitting. The tip of the solder can be bent to the size of the pipe in order to avoid over soldering. With the pipes and fitting in place, the torch is then ignited with the striker or by an auto-strike mechanism to initiate soldering. After heating for a few moments, if the copper surface is hot enough such that it melts when touched by the end of the solder, the solder can then be applied to the joint seam so that it runs around the joint and bonds the pipe and fitting together.

In recent years, push-fit technology has been employed with piping systems to reduce the dangers and time involved in soldering joints. Push-fit methods require minimal knowledge of pipe fitting and involve far fewer materials than soldering. For example, one may only need the pipes, quick-connect fittings, a chamfer/deburring tool and tubing cutter in order to connect pipes using push-fit technology.

The steps involved in connecting piping systems using push-fit technology can be outlined as follows. First, the pipe is cut to the appropriate length and the end of the pipe is cleaned with the deburring tool. Then the pipe and fitting are pushed together for connection. The fitting is provided with a fastening ring (also called a collet, grip ring or grab ring) having teeth that grip the pipe as it is inserted. The fastening ring device is employed to provide opposing energy, preventing the device from disconnection while creating a positive seal. Accordingly, no wrenches, clamping, gluing or soldering is involved. Push-fit and/or quick-connect technology for piping systems can be obtained, for example, through Quick Fitting, Inc. of Warwick, R.I., USA, suppliers of the CoPro®, ProBite®, LocJaw™, Blue-Hawk™, CopperHead® and Push Connect® lines of push fittings and related products. Also, such technology is described, for example, in U.S. Pat. No. 7,862,089, U.S. Pat. No. 7,942,161, U.S. Pat. No. 8,205,915, U.S. Pat. No. 8,210,576, U.S. Pat. No. 8,398,122, U.S. Pat. No. 8,480,134, U.S. Pat. No. 8,844,974, U.S. Pat. No. 8,844,981, U.S. Pat. No. 9,068,680, and U.S. Pat. No. 9,217,529, the disclosures of which are incorporated herein by reference in their entireties.

SUMMARY

The present disclosure describes, in part, a locking pipe joint assembly, device and method that provides a tight seal without damage to the fitting elements or the pipe, and with zero resistance to the pipe upon insertion or removal. The present disclosure describes connecting piping using no clamps, solder or glues, while creating a leak-free seal at the connected joining area. Further, the present disclosure describes embodiments of a device that can join both like and unlike piping elements without coining or threading the elements into place.

The quick connection pipe joint device provided according to embodiments of the present disclosure employs a center body connector, one or more sealing elements, such as a wiper seal and a sealing ring, a sealing ring retainer, an indicator ring and a retaining cap. In various embodiments, the retaining cap and the center body connector include mating block members that permit sliding bolted connection along an axis perpendicular to the main axis of the center body connector, which allows the retaining cap to tighten the packing arrangement components around an inserted piping or tubing element, and in secure engagement with the interior of the center body connector.

BRIEF DESCRIPTION OF THE DRAWINGS

FIG. 4 shows a perspective view of a center body connector according to embodiments of the present disclosure.

FIG. 5 shows a right side view of the center body connector of FIG. 4.

FIG. 6 shows a cross-sectional view of the center body connector taken along line 6-6 of FIG. 5.

FIG. 7 shows an enlarged view of encircled portion 7-7 of FIG. 6.

FIG. 8 shows a right side view of a retaining cap according to embodiments of the present disclosure.

FIG. 9 shows a cross-sectional view of the retaining cap taken along line 9-9 of FIG. 8.

FIG. 10 shows an enlarged view of encircled portion 10-10 of FIG. 9.

FIG. 11 shows a perspective view of the retaining cap of FIG. 8.

FIG. 18 shows a right side view of a sealing ring retainer according to embodiments of the present disclosure.

FIG. 19 shows a cross-sectional view of the wiper seal taken along line 19-19 of FIG. 18.

FIG. 20 shows an enlarged view of encircled portion 20-20 of FIG. 19.

DETAILED DESCRIPTION

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

As shown in FIGS. 1 through 28, embodiments of the present invention provide a locking pipe joint assembly, device and method that facilitate connection and disconnection of piping elements with zero resistance.

Figure 1:
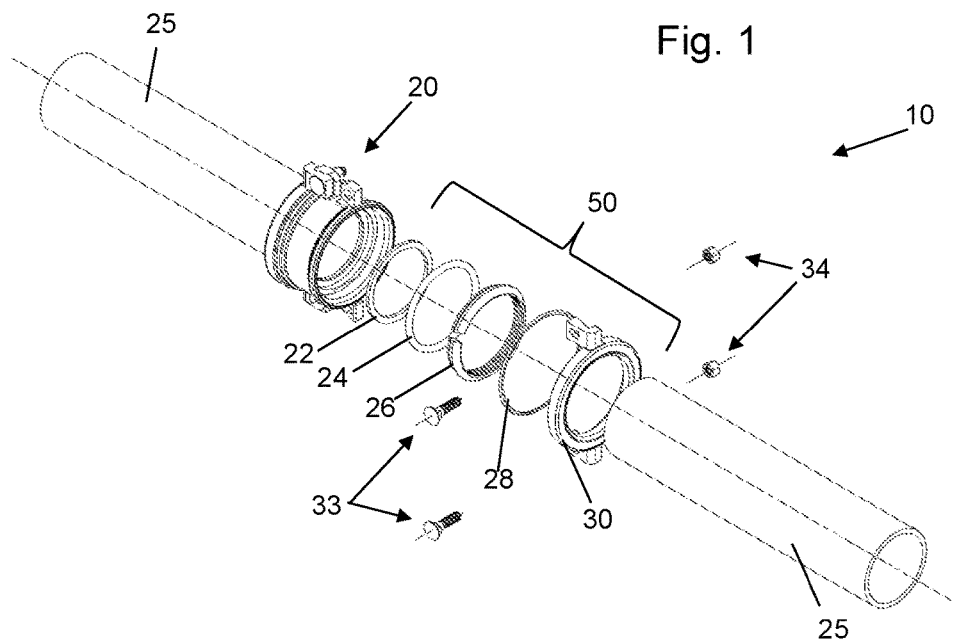
FIG. 1 shows a partially exploded perspective view of a device in accordance with embodiments of the present disclosure.
Figure 2:
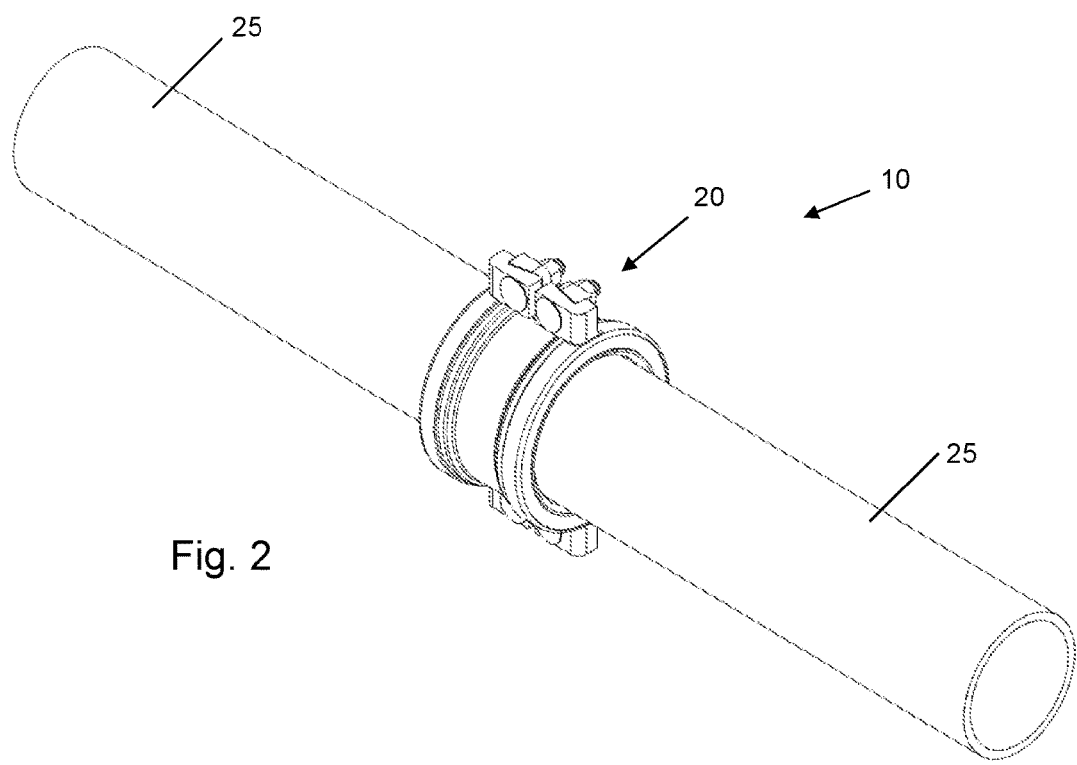
FIG. 2 shows a perspective view of a device in accordance with embodiments of the present disclosure.
Figure 3:
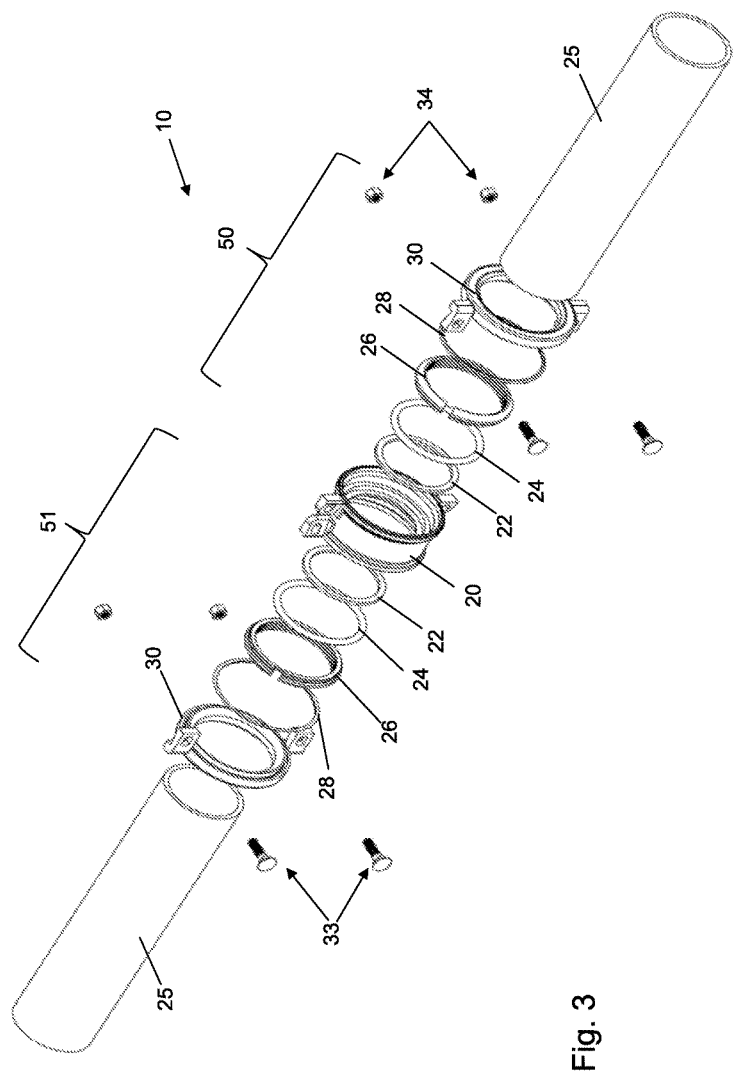
FIG. 3 shows an exploded perspective view of a device in accordance with embodiments of the present disclosure.

As shown, for example, in FIGS. 1 through 3, embodiments of the device 10 include a center body connector 20 and one or more packing arrangements 50, 51 that, when combined yet not tightened, form a cavity for the zero resistance insertion of one or more piping or tubing elements 25. Once a pipe 25 is inserted, the packing arrangement 50, 51 can be tightened against the body connector 20 to provide a leak-free seal.

In various embodiments, as shown in FIGS. 1 through 3, the packing arrangement 50 or 51 can include one or more of the following components: a wiper seal 22, a sealing ring 24, a sealing ring retainer 26, an indicator ring 28 and a retaining cap 30. One or more bolt elements 33 and one or more nut connectors 34 can be considered part of the packing arrangement according to embodiments of the disclosure. A center body connector 20 may or may not be considered part of the packing arrangement. In various embodiments, a packing arrangement 50, 51 is inserted into and/or joined with the center body connector 20.

As shown in FIGS. 4 through 7, the center body connector 20 includes a center segment 21, with a first 35 and a second 37 pipe receiving segment on either side of the center segment 21. The center body connector 20 includes a radially outer surface 23, first 38 and second 39 axial end wall surfaces, and a radially interior surface 40 forming a cavity 42 extending axially through the body connector along an axis 44. An inner flange 45 is integrally formed with and is part of the center body connector 20, and includes radially extending side wall surfaces (e.g., 43, 46) that act as a tube stop for stopping inserted tubes and/or pipes (e.g., pipe 25). The inner flange 45 extends radially inwardly from the interior surface 40 at the axially inner segment 48 of center body connector 20. One or more outer blocks or flanges 52 are provided, each of which is integrally formed with and is part of the center body connector 20, and extends radially outwardly from the outer surface 23 of center body connector 20. In various embodiments, the blocks 52 extend from the axially outer segments 53 of center body connector 20.

Flange 45 can be located between pipe receiving segments 35, 37, and extends radially inwardly towards the center body connector longitudinal axis 44, resulting in an internal radius from the longitudinal axis 44 to the tube stop flange 45 of R1, as shown in FIG. 6. In some embodiments, R1 is substantially equivalent to the internal radius of the piping element(s) 25 being connected, thereby enabling a seamless connection between the pipe(s) 25 from the perspective of fluids, etc., traveling within pipe(s) 25. In various embodiments, the center body connector can be formed (e.g., forged, cast, extruded, pressed) in brass, aluminum, steel, malleable iron, plastic or copper, for example, with full porting and full flow. Such forming can be by hydroforming, hydro-molding, compression forming, vacuum forming, pressure forming, tube forming, die casting, sand casting, investment casting, wax casting and other established forming methods, for example. Forming can be an alternative method to metal die stamping, for example.

In various embodiments, as shown in FIGS. 4 through 7, for example, the flange 45 has a first side interior wall surface 43 and a second side interior wall surface 46. At least a first pipe receiving segment 35 of the body connector interior surface 40 extends from the first side interior wall surface 43 of the flange 45 to a first axial end wall surface 38 and forms first 53, second 55 and third 57 compartments of increasing radial distance from the axis 100. In some embodiments, the interior radius of the pipe receiving segments 35, 37 may vary at different points along the longitudinal axis 100. This varying radius facilitates the receipt of different parts in, for example, packing arrangements 51, 52. More specifically, as shown for example in FIG. 6, axially outer segment 57 of interior surface 40 is associated with a radius R4, axial mid-segment 55 is associated with radius R3, and axially inner segment 54 is associated with a radius R2. In various embodiments, interior surface 40 includes a sloped segment 59 of varying radius between the axially outer segment 57 and the axial mid-segment 55. With such form, the interior surface 40 is adapted to engage the sealing ring retainer 26 during operation as described elsewhere herein.

As further shown in FIGS. 6 and 7, block 52 includes an axial outer end wall surface 60, an axial inner face 62, an axial top face 64, a front engaging surface 66 and a back surface 68, and wherein the axial outer end wall surface 60 has a first width W1 and the axial inner face has a second width W2, and wherein the first width W1 is larger than the second width W2 such that the front engaging surface 66 is not parallel with the back surface 68. The block 52 is formed to include an opening 70 extending through the front engaging surface 66 and back surface 68, as shown in FIGS. 5 through 7, for example. In various embodiments, the opening 70 is formed with an inner surface 79 and an oval shape which, along with the non-parallel surfaces 66, 68, facilitates sliding bolt connections and compression of corresponding packing arrangements during operation, as described herein. In embodiments, as shown in FIG. 4, the block opening 70 has an axis 80 that is substantially perpendicular to the center body connector axis 44. In various embodiments, as shown in FIGS. 6 and 7, for example, the axial end wall surface 60 of the block 52 is formed with an axially inwardly extending notch 72. The notch 72 securely engages the body segment 134 of the radially extending wall 94 of the retaining cap 30 during operation, as described elsewhere herein. In various embodiments, the notch 72 is formed by an axially extending upper wall 73, a radially extending mid wall 75 and an axially outwardly, radially inwardly extending lower wall 77. The upper wall 73 is formed at a radial distance R5 from the axis 44.

As further shown in FIGS. 4 through 7, the center body connector 20 can include multiple blocks 52, each of which is provided so as to engage a corresponding bolt retaining block of the retaining cap 30. As shown in FIGS. 8 through 11, the retaining cap 30 is provided with one or more bolt retaining blocks 90, each having a bolt retaining cavity 92. As shown in FIGS. 9 and 11, the bolt retaining cavity 92 is formed so as to be non-cylindrical. In various embodiments, the bolt retaining cavity 92 includes a cylindrical inner segment 93 and a non-cylindrical bolt neck receiving segment 99 (see FIG. 26), which facilitates receiving a bolt such as a step bolt having a squared-off surface under the head. The retaining cap 30 is formed with a radially extending wall 94 and an axially extending wall 96, with the radially extending wall 94 having a radial outer surface 98 to which the bolt retaining blocks 92 are secured and/or integrally formed. It will be appreciated that the integral forming of the bolt retaining block(s) with the radially extending wall 94 provides the retaining cap 30 with a monolithic structure. Each bolt retaining block 92 is provided with an axially extending outer side surface 110, an axially extending inner side surface 112, and further includes a cavity 92 extending through the axial outer side surface 110 and the axially extending inner side surface 112, wherein the retaining cap axially extending wall 96 is adapted to engage the center body connector 20 such that the center body connector axis 44 and the retaining cap axis 104 are coaxial, and wherein the axis 114 of the bolt retaining cavity 92 is substantially perpendicular to the retaining cap axis 104. In embodiments, the inner side surface 112 of the bolt retaining block 90 of the retaining cap 30 includes a base segment 116 and a leg segment 118 extending from the base segment 116 toward the radial outer edge surface 131, wherein the leg segment 118 and the axially extending outer side surface 110 are not parallel. The base segment 116 can include a platform surface 117 for engaging axial outer end wall surface 60 of block 52 when the retaining cap 30 is engaged with the center body connector 20.

As further shown in FIGS. 8 through 11, the bolt retaining block 90 of the retaining cap 30 includes an axial undersurface 125, an axial top surface 127, a radial base surface 129, and a radial outer edge surface 131. The axially extending wall 96 of the retaining cap 30 can include a radially outer surface 130, and the radially extending wall 94 can include a neck segment 132 having a neck width W3 and a body segment 134 having a body width W4, wherein the body width W4 is greater than the neck width W3. As further shown in FIGS. 9 and 10, axially extending wall 96 can include an axial lead wall surface 136 and an angled wedge surface 138. The neck segment 132 of the radially extending wall 94 further can include a shoulder segment 140 extending axially inwardly to the body segment 134, thereby forming a ridge 142 for engaging the notch 72 of the block member 52 of center body connector 20. Such arrangements as described facilitate smooth engagement of the retaining cap 30 with the center body connector 20 during operation. In various embodiments, and similar to the center body connector 20, the retaining cap 34 can be forged or formed in brass, aluminum, steel, malleable iron, copper, other metallic material or non-metallic material, for example.

Figure 12:
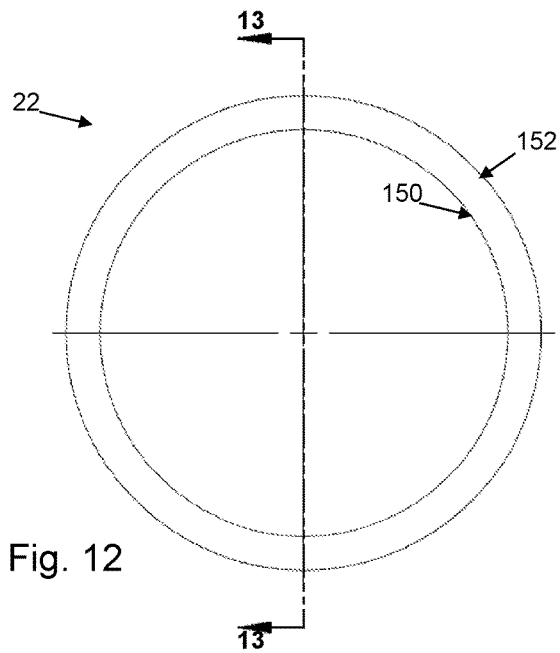
FIG. 12 shows a right side view of a wiper seal according to embodiments of the present disclosure.
Figure 13:
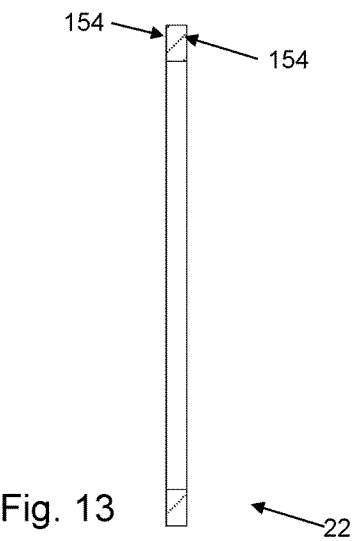
FIG. 13 shows a cross-sectional view of the wiper seal taken along line 13-13 of FIG. 12.
Figure 16:
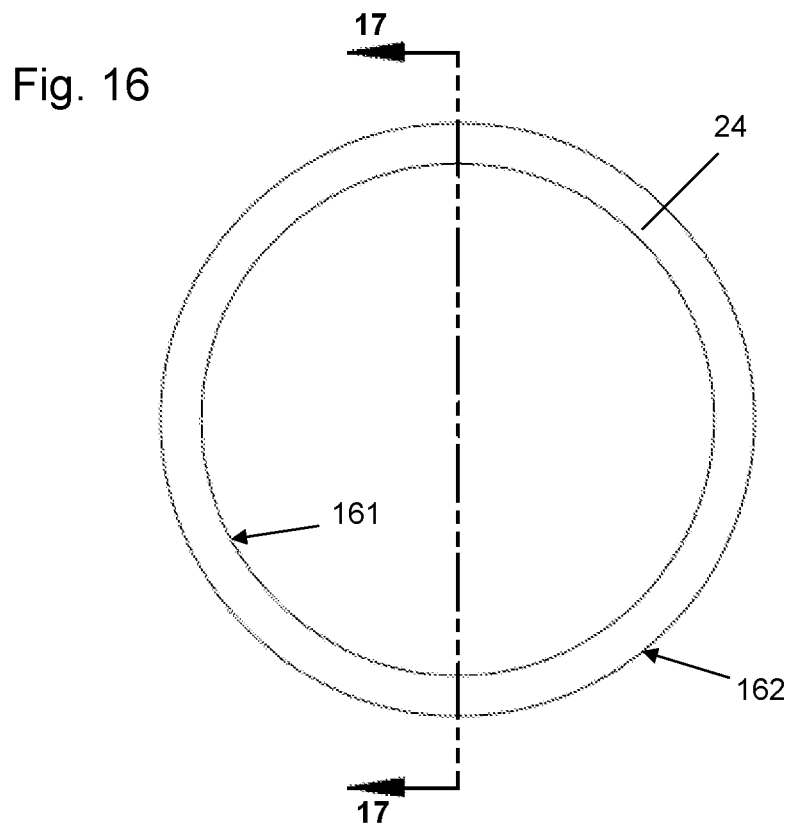
FIG. 16 shows a right side view of a sealing ring according to embodiments of the present disclosure.
Figure 17:
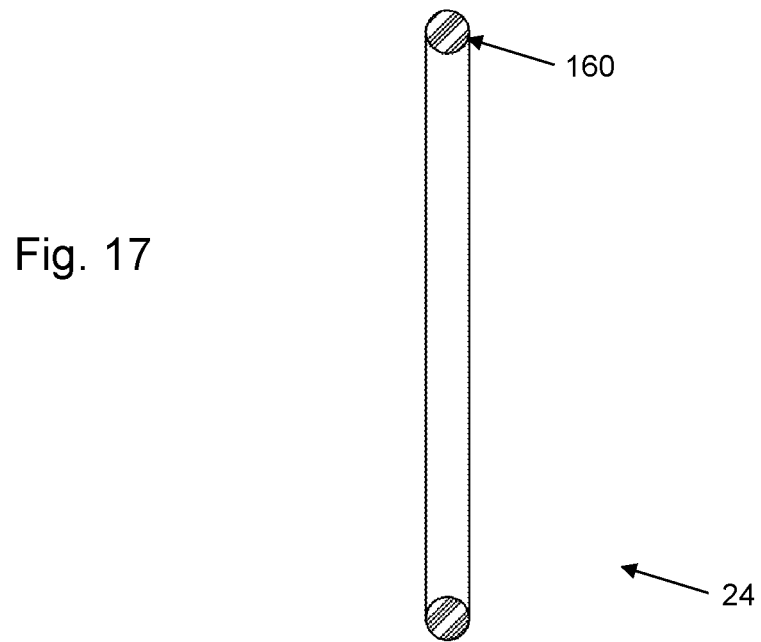
FIG. 17 shows a cross-sectional view of the sealing ring taken along line 17-17 of FIG. 16.

FIGS. 12, 13, 16 and 17 illustrate embodiments of sealing members that can be employed with the device as disclosed. As shown in FIGS. 12, and 13, a wiper seal 22 can be used to help seal the pipe (e.g., pipe 25) connection once tightened. In various embodiments, the wiper seal 22 can have a substantially rectangular cross-sectional shape, including a radially inner wall surface 150, a radially outer wall surface 152 and side surfaces 154. As shown in FIGS. 16 and 17, the sealing ring 24 can have a substantially ring-shaped body 160 with a substantially circular cross-section, including a radially inner surface 161 and a radially outer surface 162. It will be appreciated that the radial distance to the radially outer wall surface 152 of wiper seal 22 can be substantially the same as the radial distance R2 to axially inner segment 54 of the center body connector 20, and the radial distance to the radially outer surface 162 of sealing member 24 can be substantially the same as the radial distance R3 to axial mid-segment 55 of the center body connector 20. It will further be appreciated by those having skill in the art that sealing member 24 may comprise a flat ring or washer-type seal member in addition to or as an alternative to a circular member of substantially circular cross-section, as shown in FIGS. 16-17. In various embodiments, the sealing elements (e.g., wiper seal 22 and sealing member 24) can be formed from a rubber or similar compressible material and can be lubricated with a food grade lubricant, for example. In various embodiments, the wiper seal 22 and the sealing member 24 can be integrated and formed as a single, unitary monolithic sealing element having a substantially similar shape and geometry to the combined individual elements 22 and 24 shown in FIGS. 12, 13, 16 and 17.

FIGS. 18 through 20 illustrate an exemplary embodiment of sealing ring retainer 26 which is configured to retain sealing member 24 and wiper seal 22. As its geometry suggests, sealing ring retainer 26 can be configured to fit within center body connector 20 substantially at the area where the axially outer segment 57 transitions to the axial mid-segment 55 of the center body connector interior 40. In particular, sealing ring retainer 26 can include a radially outer surface 170, an axially inner surface 172, an axially outer surface 174 and a radially inner surface 175. In various embodiments, the radially inner surface 175 is provided with peaks 176 and troughs 177 to permit axial movement within the center body connector interior 40 when the packing assembly is compressed during operation. The axially inner surface 172 can be provided so as to extend substantially radially for firm engagement with sealing ring member 24. An intermediate surface 178 can be provided between the axially inner surface 172 and the radially outer surface 170, and the intermediate surface 178 can include an interior ridge 180, an inflection edge 182 and an exterior ridge 184, wherein the interior ridge 180 is formed so as to engage axial mid-segment 55 of the center body connector interior 40, and the exterior ridge 184 is formed so as to engage sloped segment 59 of the center body connector interior 40.

In various embodiments, sealing ring retainer 26 can be formed as a unitary, single body member, and can optionally be formed with a first circumferential end point 190 and a second circumferential end point 192 that do not connect and thereby form a slit 194, which allows the retainer 26 to be manually pinched and compressed to facilitate installation into the center body connector 20.

Figure 14:
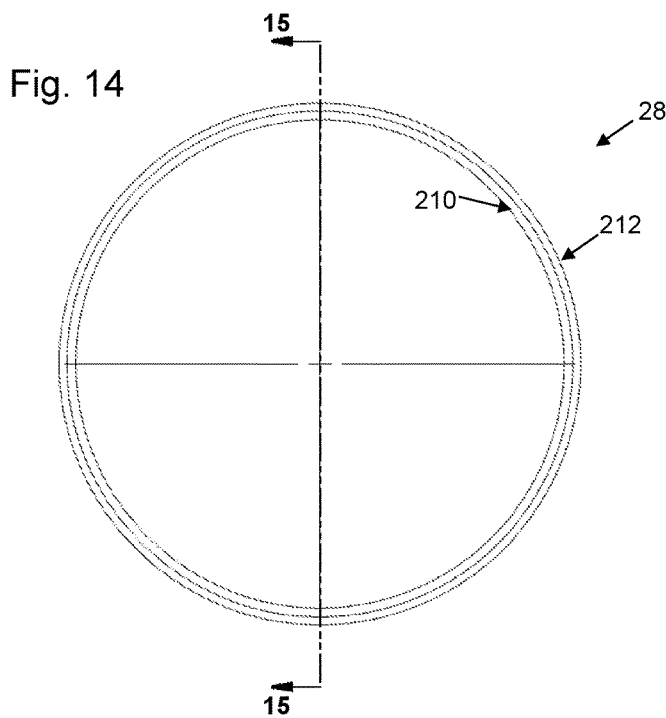
FIG. 14 shows a right side view of an indicator ring according to embodiments of the present disclosure.
Figure 15:
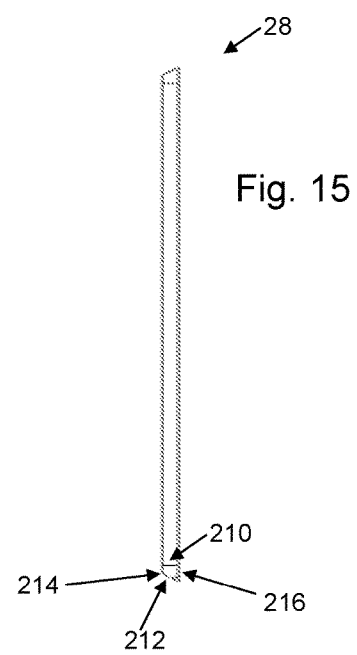
FIG. 15 shows a cross-sectional view of the indicator ring taken along line 15-15 of FIG. 14.
Figure 22:
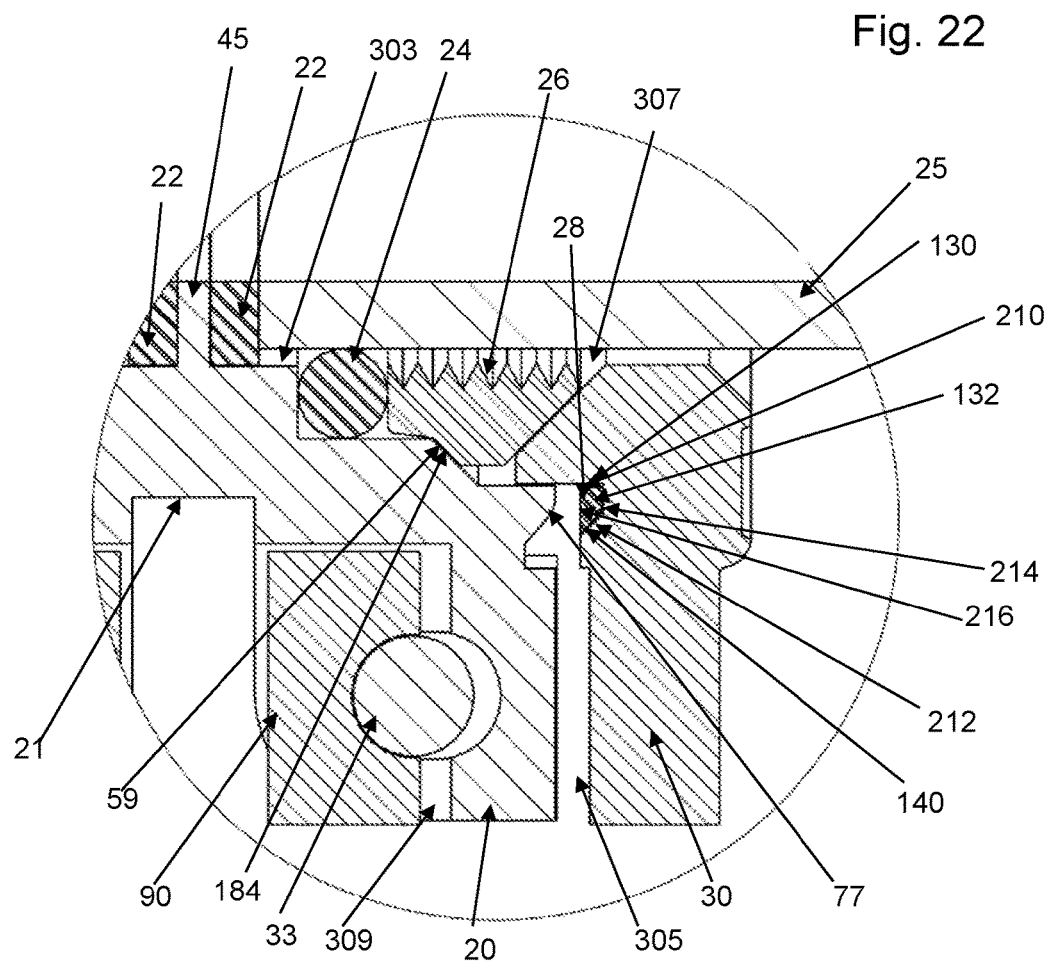
FIG. 22 shows an enlarged view of encircled portion 22-22 of FIG. 21.

In various embodiments, an indicator ring 28 is provided that extends outwardly of the outer surface of the joined retaining cap 30 and center body connector 20, to provide a visual indicator that sufficient connective pressure has been applied for the seal to operate properly. The indicator ring 28 can comprise a membrane of low density rubber, in various embodiments of the present invention, and can be of a special distinctive color to facilitate visual inspection as described elsewhere herein. As shown in FIGS. 14 and 15, the indicator ring 28 includes surfaces that provide structure to support interoperation, connection and engaged movement with other surfaces of other components of the present invention, as shown and described herein. For instance, indicator ring has a radially interior surface 210 and radially exterior surface 212, and further includes an axially exterior surface 214 and axially interior surface 216. As shown in FIG. 22, axially exterior surface 214 engages neck segment 132 of retaining cap 30, radially exterior surface 212 engages shoulder segment 140 of retaining cap, radially interior surface 210 engages radially outer surface 130 of the axially extending wall 96 of the retaining cap 30, and axially interior surface 216 of the indicator ring 28 is in position to engage lower wall 77 of the notch 72 of the center body connector 20. It will be appreciated that the indicator ring 28 can be of sufficient durometer and have sufficient expandable material in order to appropriately extrude outside of the fitting when a tube is inserted and the device is locked as described herein.

Figure 21:
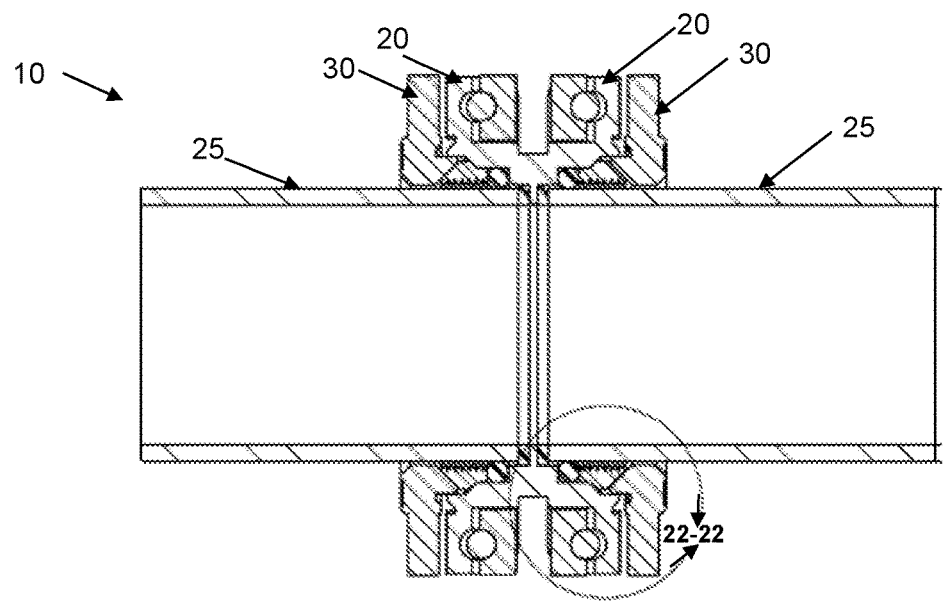
FIG. 21 shows a cross-sectional view of an embodiment of the device according to the present disclosure.
Figure 23:
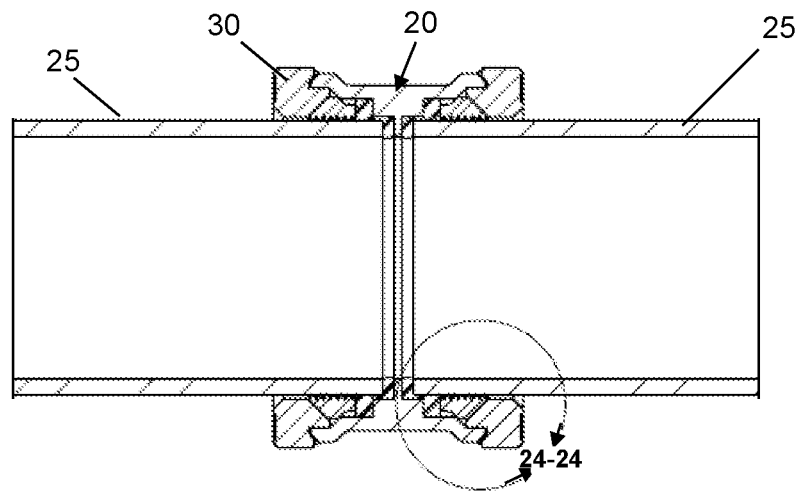
FIG. 23 shows a cross-sectional view of an embodiment of the device according to the present disclosure.
Figure 24:
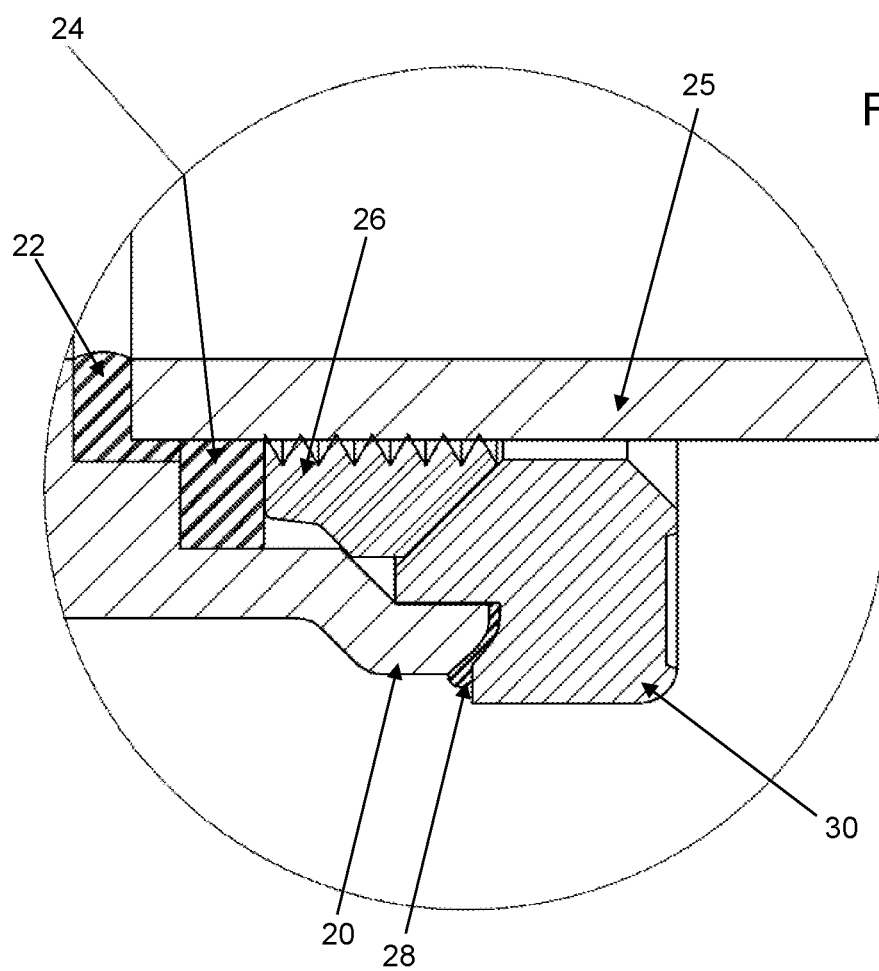
FIG. 24 shows an enlarged view of encircled portion 24-24 of FIG. 23.
Figure 25:
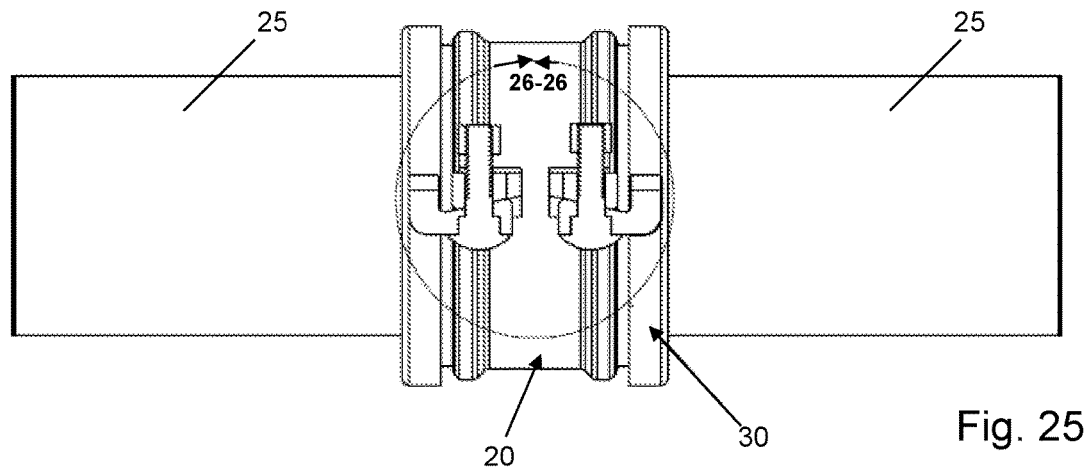
FIG. 25 shows a cross-sectional view of an embodiment of the device according to the present disclosure including block members, bolt members and nut connectors.
Figure 26:
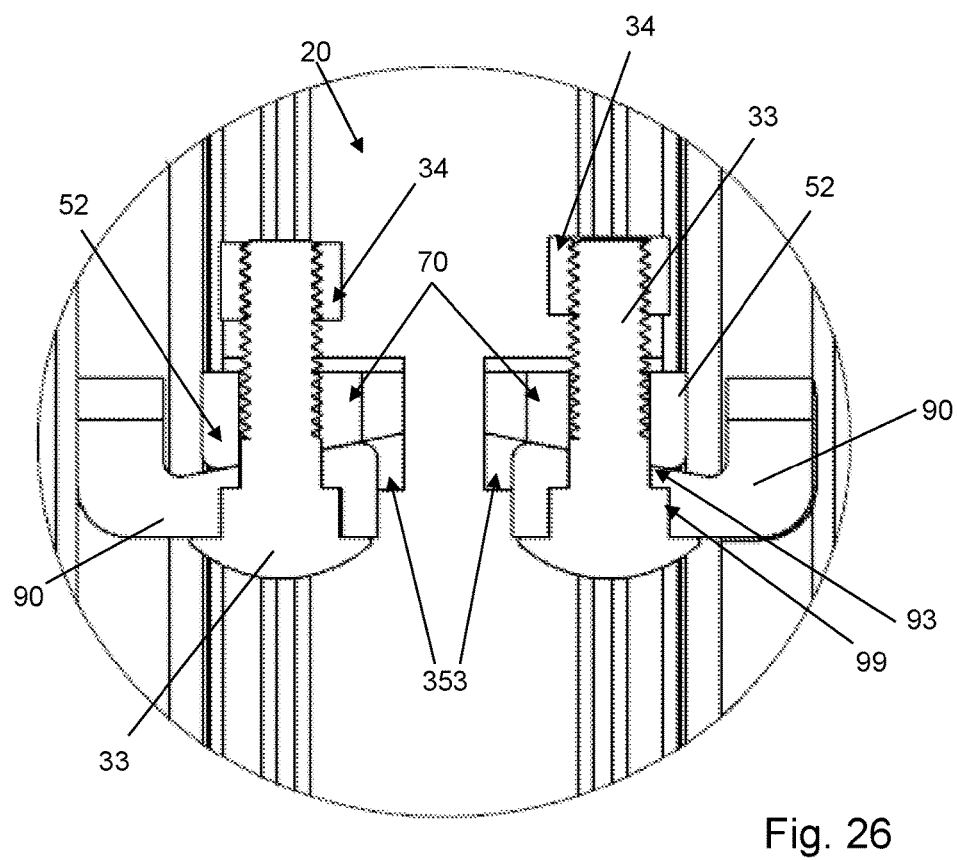
FIG. 26 shows an enlarged view of encircled portion 26-26 of FIG. 25.
Figure 27:
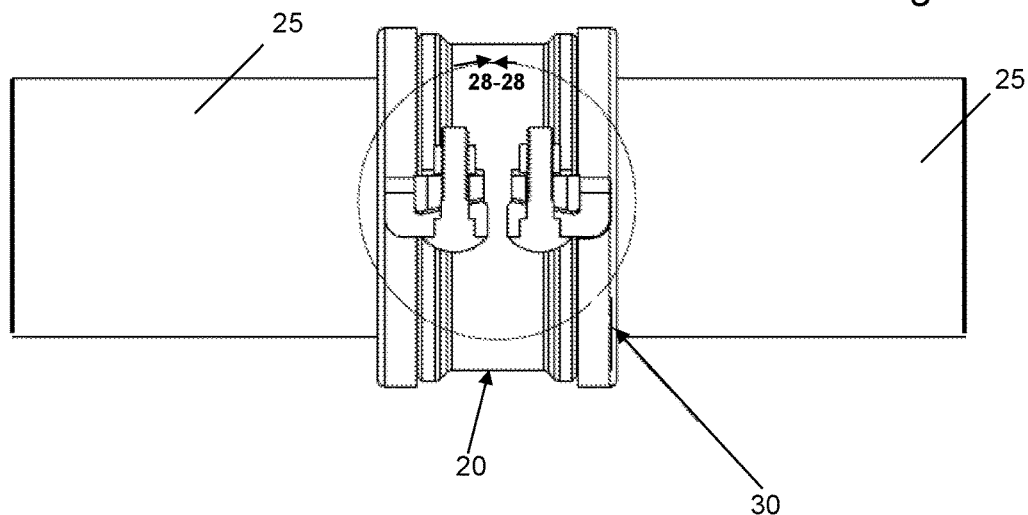
FIG. 27 shows a cross-sectional view of an embodiment of the device according to the present disclosure including block members, bolt members and nut connectors.
Figure 28:
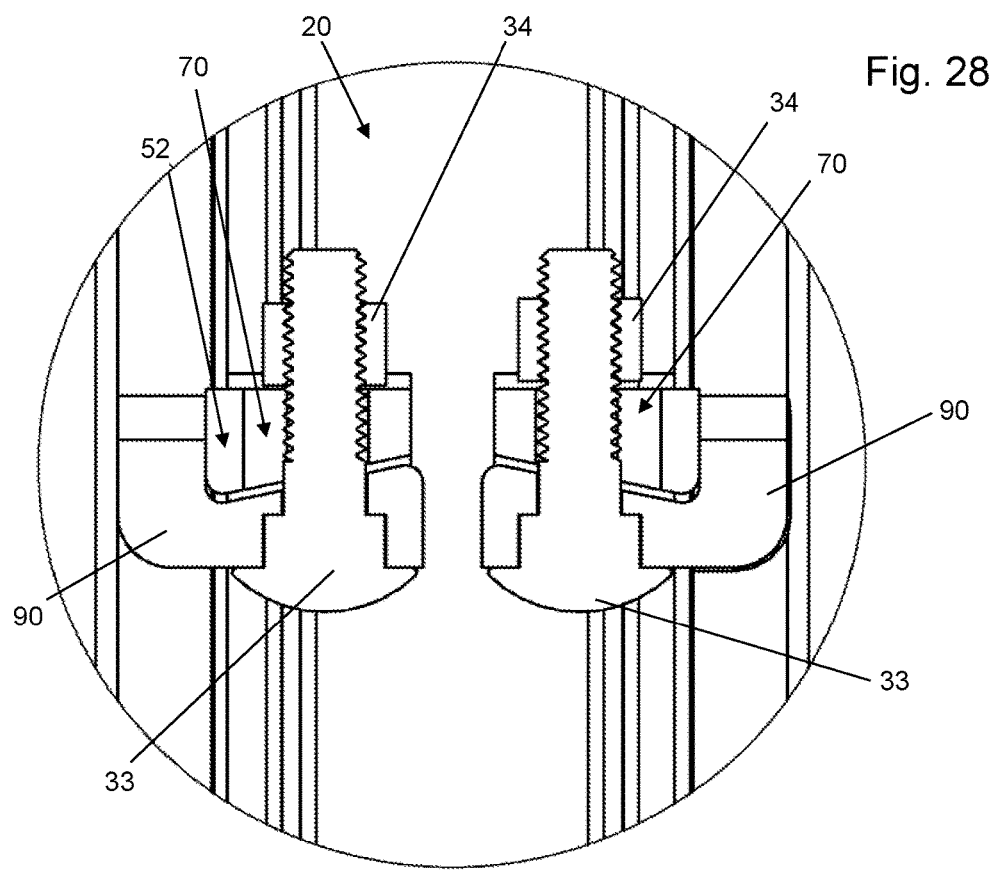
FIG. 28 shows an enlarged view of encircled portion 28-28 of FIG. 27.

In operation, the center body connector 20 is provided, having wiper seal 22, sealing ring 24, and sealing ring retainer 26 installed therein. Indicator ring 28 can optionally be positioned as shown and described above. A user can then install retaining cap 30 onto one end of a pipe 25 to be connected. The pipe 25 can then be inserted into one side of center body connector 20 with no resistance, and the packing arrangement can appear, for example, as shown in FIGS. 21 and 22. As can be seen therein, sealing elements 22, 24 are not yet compressed, and a gap 303 exists between wiper seal 22 and sealing ring 24, a gap 305 exists between center body connector 20 and retaining cap 30, a gap 307 exists between sealing ring retainer 26 and retaining cap 30, and a gap 309 exists between center body connector 20 and block 90. From another view, as shown in FIGS. 25 and 26, bolts 33 are inserted through respective blocks 90 and blocks 52 into a respective nut connector 34. When initially engaged, bolts 33 engage the axially outer segment of cavities 70 of the blocks 52. Further, block 90 remains axially outwardly of block 52, leaving axially interior space on platforms 353. As the nut connectors 34 and bolt members 33 are tightened together, the gaps 303, 305, 307 and 309 are closed, and wiper seal 22, sealing ring 24, sealing ring retainer 26 and indicator ring 28 are securely maintained between the center body connector 20 and the retaining cap 30, as shown in FIGS. 23 and 24. Further, at this time, the bolt 33 and nut connector 34 have engaged to draw the block 90 along platform 353 to reside axially inwardly of block 52 and so as to reside on the axially interior segment of cavity 70, as shown in FIGS. 26 and 27. In this way, the packing arrangement and inserted pipe are securely retained together. Further, the indicator ring 28 extends radially outwardly of the center body connector 20 and retaining cap 30, providing a visual indicator of a proper seal to a user. It will be appreciated that the axial compression force of tightening the bolt member and nut connector translates into axial and radial compression of the packing arrangement to create a tight seal. A similar procedure can be employed for the corresponding pipe 25 on the opposite side of connector 20. Once tightened, a leak proof, sealed connection is established. In the event a user desires to disconnect the coupled pipes 25, the process may simply be reversed, allowing for clean, easy access to the interior of the pipe 25. If desired, the pipes 25 could then be re-connected using the same procedure and parts.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A locking pipe joint device, comprising:
 a center body connector having an outer surface, an axial end wall surface, and an interior surface forming a cavity extending through the body connector along a center body connector axis, the center body connector including at least one block extending radially outwardly from the outer surface, wherein the at least one block is formed with at least one opening having an inner surface and an axial end wall surface, wherein the block opening axis is substantially perpendicular to the center body connector axis;
 at least one retaining cap having a radially extending wall and an axially extending wall, with the radially extending wall having a radial outer surface having at least one bolt retaining block extending radially outwardly thereof, and wherein the at least one bolt retaining block has an axially extending outer side surface and an axially extending inner side surface, and further includes a cavity extending through the axially extending outer side surface and the axially extending inner side surface, wherein the retaining cap axially extending wall is adapted to engage the center body connector such that the center body connector axis and the retaining cap axis are coaxial, and wherein the bolt retaining cavity axis is substantially perpendicular to the retaining cap axis; and an indicator ring positioned between the radially extending wall of the at least one retaining cap and the axial end wall surface of the at least one block of the center body connector, wherein the indicator ring extends radially outwardly of the center body connector between the center body connector and the at least one retaining cap upon compression of the indicator ring.

2. The device of claim 1, further including a first packing arrangement engaged with the retaining cap inner surface and the body connector interior surface, whereupon as the retaining cap engages the center body connector, the first packing arrangement is compressed.

3. The device of claim 2, wherein the first packing arrangement comprises at least one sealing member and a sealing ring retainer.

4. The device of claim 3, wherein the sealing ring retainer is split.

5. The device of claim 1, wherein the axially extending inner side surface of the bolt retaining block of the retaining cap includes a base segment and a leg segment extending from the base segment toward the radial outer edge surface, wherein the leg segment and the axially extending outer side surface are not parallel.

6. The device of claim 1, wherein the bolt retaining block cavity is formed so as to be non-cylindrical.

7. The device of claim 1, wherein the at least one block of the center body connector includes an axial outer face, an axial inner face, an axial top face, a front engaging surface and a back surface, and wherein the axial outer face has a first width and the axial inner face has a second width, and wherein the first width is larger than the second width such that the front engaging surface is not parallel with the back surface.

8. The device of claim 1, wherein the at least one block of the center body connector comprises first and second blocks, wherein the at least one block of the retaining cap comprises initial and secondary blocks, and further wherein as the retaining cap engages the center body connector, the first block of the center body connector engages the initial block of the retaining cap, and the second block of the center body connector engages the secondary block of the retaining cap.

9. The device of claim 1, wherein the at least one bolt retaining block of the retaining cap includes an axial undersurface, an axial top surface, a radial base surface, a radial outer edge surface, wherein the axially extending inner side surface of the bolt retaining block of the retaining cap includes a base segment and a leg segment extending from the base segment toward the radial outer edge surface, wherein the leg segment and the axial outer side surface are not parallel.

10. The device of claim 9, wherein the at least one block of the center body connector includes an axial outer face, an axial inner face, an axial top face, a front engaging surface and a back surface, and wherein the axial outer face has a first width and the axial inner face has a second width, wherein the first width is larger than the second width such that the front engaging surface is not parallel with the back surface, and further wherein as the retaining cap engages the center body connector, the front engaging surface of the at least one block of the center body connector engages the leg segment of the axial inner side surface of the at least one block of the retaining cap.

11. The device of claim 1, wherein the at least one block of the center body connector comprises two pairs of diametrically opposed blocks.

12. The device of claim 1, wherein the opening of the at least one block of the center body connector is formed so as to be non-cylindrical.

13. The device of claim 1, further including a bolt element extending through the bolt retaining cavity of the at least one block of the retaining cap and further extending through the opening of the at least one block of the center body connector.

14. The device of claim 13, further including a nut element threadedly engaged with the bolt element, whereupon tightening the threaded engagement of the nut element with the bolt element causes the bolt to slide within the bolt retaining cavity of the at least one block of the retaining cap and within the opening of the at least one block of the center body connector.

15. The device of claim 14, wherein the bolt slides in a direction coinciding with the center body connector axis.

16. The device of claim 1, wherein the axially extending wall of the retaining cap includes a radially outer surface, and wherein the radially extending wall of the retaining cap includes a neck segment having a neck width and a body segment having a body width, wherein the body width is greater than the neck width, and further wherein the at least one block of the center body connector has an axial end wall surface substantially co-planar with the center body connector axial end wall surface.

17. The device of claim 16, wherein the axial end wall surface of the at least one block is formed with an axially inwardly extending notch for engaging the body segment of the radially extending wall of the retaining cap.

18. A locking pipe joint device, comprising:
a center body connector having a center segment, an outer surface, an axial end wall surface, and an interior surface forming a cavity extending through the body connector along a center body connector axis, the center body connector including first and second diametrically opposed blocks extending radially outwardly from the outer surface, wherein each block is formed with at least one opening having an inner surface and an axial end wall surface, wherein each block opening axis is substantially perpendicular to the center body connector axis;
at least one retaining cap having a radially extending wall and an axially extending wall, with the radially extending wall having a radial outer surface having first and second diametrically opposed bolt retaining blocks extending radially outwardly thereof, and wherein each of the bolt retaining blocks has an axially extending outer side surface and an axially extending inner side surface, and further includes a cavity extending through the axially extending outer side surface and the axially extending inner side surface, wherein the retaining cap axially extending wall is adapted to engage the center body connector such that the center body connector axis and the retaining cap axis are coaxial, and wherein each of the bolt retaining cavity axes is substantially perpendicular to the retaining cap axis; and
an indicator ring positioned between the radially extending wall of the at least one retaining cap and the axial end wall surface of at least one of the blocks of the center body connector, wherein the indicator ring extends radially outwardly of the center body connector between the center body connector and the at least one retaining cap upon compression of the indicator ring.

19. The device of claim 18, further including first and second bolt elements, with a first bolt element extending through the bolt retaining cavity of the first bolt retaining block of the retaining cap and further extending through the opening of the first block of the center body connector, and with the second bolt element extending through the bolt retaining cavity of the second bolt retaining block of the retaining cap and further extending through the opening of the second block of the center body connector.

20. The device of claim 19, wherein the first bolt is slidably engageable with the bolt retaining cavity of the first bolt retaining block and the opening of the first block of the center body connector in a direction coinciding with the center body connector axis.

21. The device of claim 19, further including first and second nut elements, wherein the first nut element is threadedly engaged with the first bolt element, whereupon tightening the threaded engagement of the first nut element with the first bolt element causes the first bolt element to slide within the first bolt retaining cavity of the at least one block of the retaining cap and within the opening of the first block of the center body connector in a direction coinciding with the center body connector axis.

22. The device of claim 19, wherein the interior surface of the center body connector has a first segment and a second segment, and further including a first packing arrangement comprising at least a first sealing ring and a first sealing ring retainer retained against the first segment of the interior wall surface, and further including a second packing arrangement comprising at least a second sealing ring and a second sealing ring retainer retained against the second segment of the interior wall surface.

* * * * *